United States Patent [19]

Bahr

[11] Patent Number: 5,010,413

[45] Date of Patent: Apr. 23, 1991

[54] METHOD AND APPARATUS FOR DISPLAYING AN ENLARGED IMAGE ON MULTIPLE MONITORS TO FORM A COMPOSITE IMAGE

[75] Inventor: Edward Bahr, Maywood, N.J.

[73] Assignee: Imtech International, Inc., New York, N.Y.

[21] Appl. No.: 419,094

[22] Filed: Oct. 10, 1989

[51] Int. Cl.$^5$ .............................................. H04N 5/68
[52] U.S. Cl. ..................................... 358/242; 358/160; 358/22
[58] Field of Search ................. 358/160, 22, 183, 140, 358/230, 242; 340/731

[56] References Cited

U.S. PATENT DOCUMENTS

| | | | |
|---|---|---|---|
| 4,746,981 | 5/1988 | Nodan et al. | 358/183 X |
| 4,800,376 | 1/1989 | Suga et al. | 358/87 X |
| 4,833,542 | 5/1989 | Hara et al. | 358/230 |
| 4,866,520 | 9/1989 | Nomura et al. | 358/140 |

Primary Examiner—Victor R. Kostak
Attorney, Agent, or Firm—Darby & Darby

[57] ABSTRACT

A method and apparatus for displaying an interlaced image on a plurality of display screens in which the lines of two fields of the image are replicated a plurality of times in a memory to produce an enlarged image, and determined lines from both of the fields are read out of the memory and combined with other lines of the same field for the production of the display screen signals.

11 Claims, 8 Drawing Sheets

}
ORIGINAL

}
EXPANDED BY N=4

FIG. 12A  ODD FIELD

FIG. 12B  EVEN FIELD

METHOD AND APPARATUS FOR DISPLAYING AN ENLARGED IMAGE ON MULTIPLE MONITORS TO FORM A COMPOSITE IMAGE

FIELD OF THE INVENTION

This invention relates to a method and apparatus for displaying an image on a plurality of video screens, such as television screens, and is more in particular directed to a method and apparatus for avoiding annoying visual artifacts and distortions in a composite image formed on the screens of a plurality of display devices.

BACKGROUND OF THE INVENTION

Figure 1A:
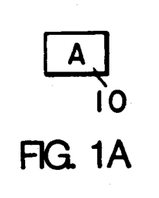
FIG. 1a is a representation of a display screen with an image thereon.
Figure 1B:
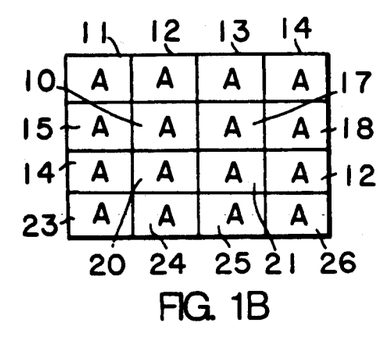
Figure 1C:
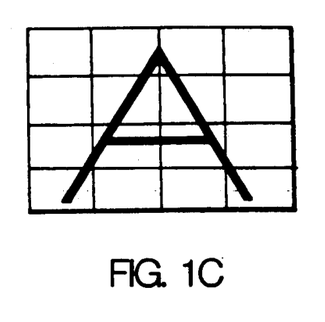

As disclosed in U.S. Pat. No. 4,746,981, J. Nadan, E. Bahr and P. Noble, assigned to the assignee of the present application, when video signals are applied to a conventional television set or monitor, the size of the image is limited to the size of the display screen of the television set or monitor, and the capacity for providing special effects is limited. Thus, FIG. 1a depicts an image in the form of the letter A on the screen 10 of one television receiver or monitor, in response to the reception of video signals corresponding to this image. It is furthermore possible to physically combine a plurality of television receivers or monitors, to form a larger image. As illustrated in FIG. 1b, four rows of four television receivers or monitors each have been stacked, to provide separate images on their respective display screens 11-26 respectively, of the letter A, in response to same video signal. It is further possible to modify the video signal corresponding to the letter A for application to the television receivers or monitors of FIG. 1b, so that the composite image on the array of their display screens forms an enlarged image, as illustrated in FIG. 1c. This effect can be created by modifying the signals to apply signals to the different receivers or monitors corresponding to different portions of the image.

Images of the type shown in FIGS. 1b and 1c are advantageous, for example, for visual merchandising, advertising, trade shows, etc.

Figure 2:
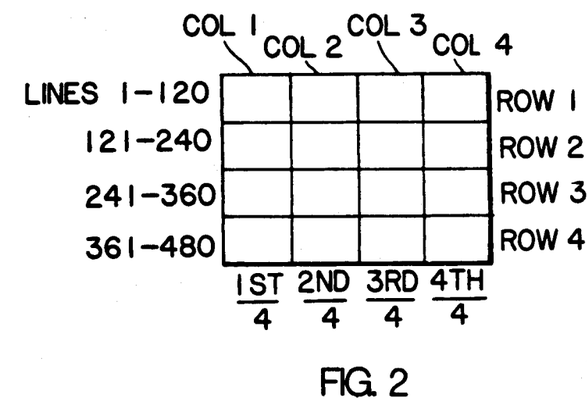
FIG. 2 is a diagram illustrating line assignment of the original signal on the display array of FIG. 1c.

The enlargement of an image to be displayed by a factor N requires that the number of lines from the video input signal applied to each receiver or monitor be divided by a factor of N. For example, if N equals 4, and the original video signal corresponds to 525 lines, of which about 480 are conventionally displayed, the signal is to be broken down a factor of 4, such that only 120 of the original input lines are displayed on each receiver. Further, only 1/Nth of each line is to be displayed on each receiver. This breakdown of the signals and the portion thereof displayed on each display screen is illustrated in FIG. 2. The breakdown may be effected, for example, by applying the composite video signal to a memory, with each receiver addressing the memory to recover only a determined portion of the stored data. In such an arrangement it is of course desirable to repeat each line or portion of a line N times in succession, where N is the number of vertically stacked display screens, in order to avoid an excessive number of blank lines on the individual display screens.

In the illustrated example, each display screen displays only a quarter of the lines of the video signals that formed the original image, and hence the signal modification requires the selection of the required part of the video line, and stretching it timewise to extend across the full width of the respective display screen.

Figure 3A:
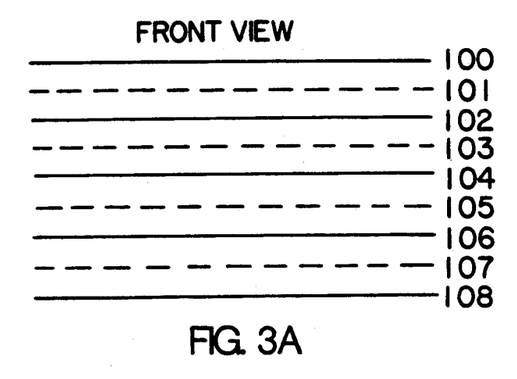
FIGS. 3A and 3B are illustrations for explaining interlaced TV signals.
Figure 3B:
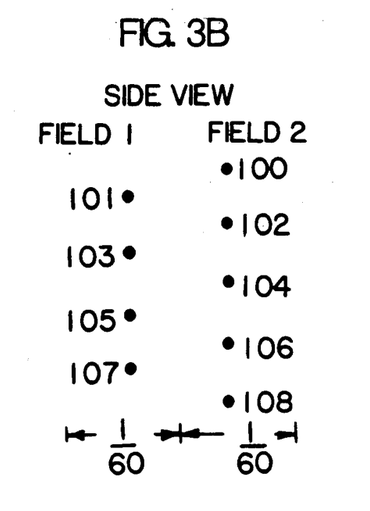

Unless special care is taken in the modification of the signal for application to each TV set or monitor, a picture will result that has visual artifacts that are noticeably annoying. These artifacts result from the fact that the transmitted picture or frame is in the form of two interlaced fields, i.e., all of the odd number lines, corresponding to the first field, are applied in a first time period of for example one sixtieth of a second, and all of the even numbered lines of the image, corresponding to a second field, are sent in the next successive time period of, for example, one sixtieth of a second. This effect is illustrated in FIG. 3, for the representative example of lines 100 through 108 of an image corresponding to the video signals. Such a signal is said to be "interlaced" since the two fields are displayed spatially within each other, the two one sixtieth of a second fields being employed to build the total picture or frame in one thirtieth of a second.

When the video signals are "expanded" to display the image on a plurality of display screens, it is apparent that the numbers of the lines (i.e. numbering downward from the top line of a frame) do not directly correspond to the line numbers of the overall image presented by the plural display screens. Thus, since each of the display screens has the same number of lines as those represented in the original video signals, it is apparent that the total number of lines of all the plural display screens is N times the number of lines of the original signal, wherein N is the number of vertically stacked display screens. Assuming for example that four display screens are stacked vertically, then without further steps being taken it is apparent that each line of the original video signals will be displayed four lines apart on the composite display screen, in order to be positioned correctly (omitting for the moment discussion of the contents of the remainder of the lines). Thus, considering the interlacing effect in an expanded picture, again with four vertically stacked display screens in the composite image, it is apparent that the lines r in the original image correspond to lines R in the expanded image, in accordance with the following relationship:

$$R_{odd} = 4r_{odd} - 3$$

$$R_{even} = 4r_{even} - 6$$

Figure 4A:
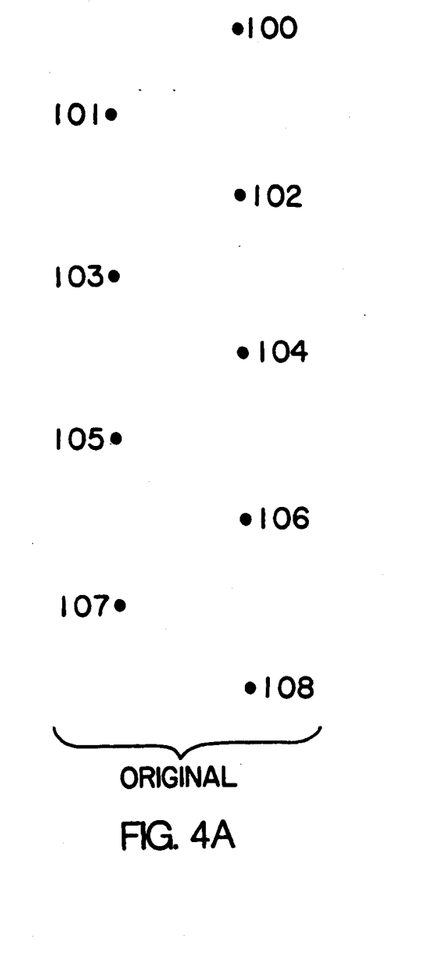
FIGS. 4A and 4B are illustrations of the correspondence between original video signal lines and lines of an expanded image.
Figure 4B:
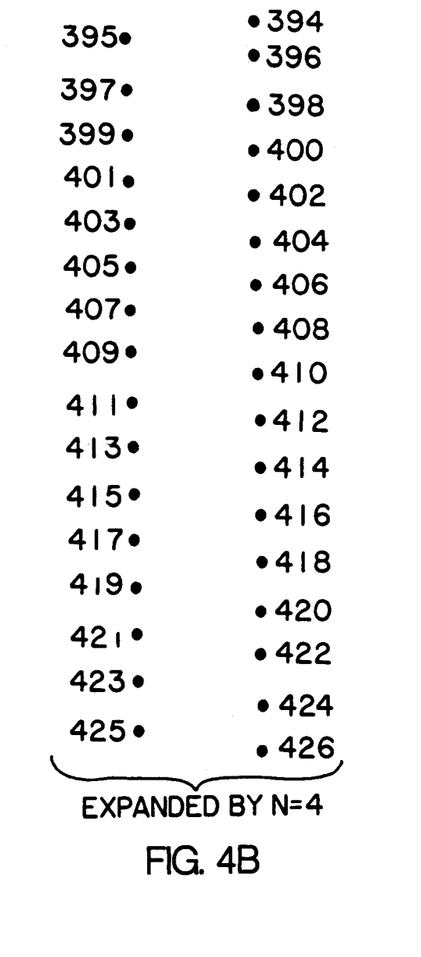

Thus, in this example, lines 100 through 108 in the image of the original video signals correspond to lines in the range of 394 to 426 in the expanded image, in the manner illustrated in FIG. 4.

Figure 5:
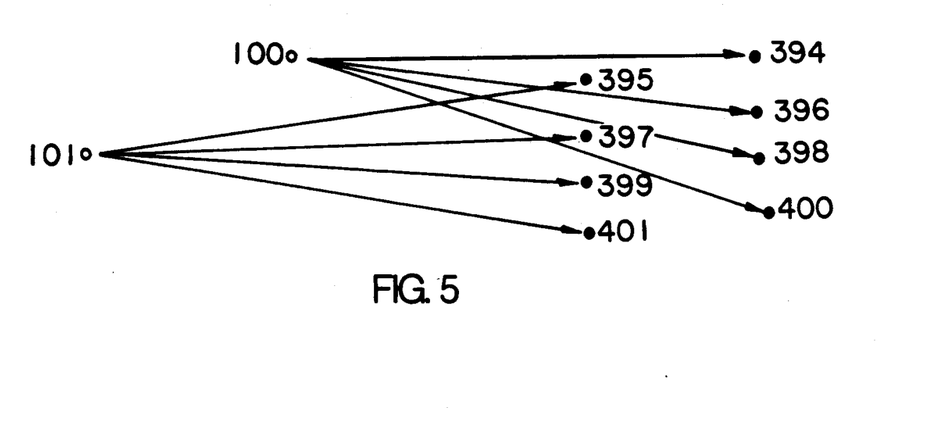
FIG. 5 is an illustration for explaining vertically distorted expansion.

An expanded image formed in accordance with the technique of FIG. 4 is unsatisfactory since video signals are displayed only on a fraction of the lines, i.e., one fourth in the illustrated example. In order to overcome this problem, it is of course possible to repeat each video signal line four successive times, in the respective field, for example in the manner illustrated in FIG. 5. In this example, original line 100 of one field has been reproduced at lines 394, 396, 398 and 400 of the expanded field, while line 101 of the other field has been displayed on lines 395, 397, 399 and 401 of the expanded field. It is apparent, however, that the expanded image illustrated in FIG. 5 will be strongly visibly impaired because the vertical spatial relationships in the original picture are destroyed by the interlacing in the expanded picture. Thus, it is apparent in FIG. 5 that the vertical relationship between the lines of the two fields is not maintained, the information of video signal line 101 correctly following the video signal line 100 in the original image, but appearing before video information corresponding to line 100 on several occasions the expanded image. This effect is vertically incorrect and noticeably annoying to the viewer.

Figure 6:
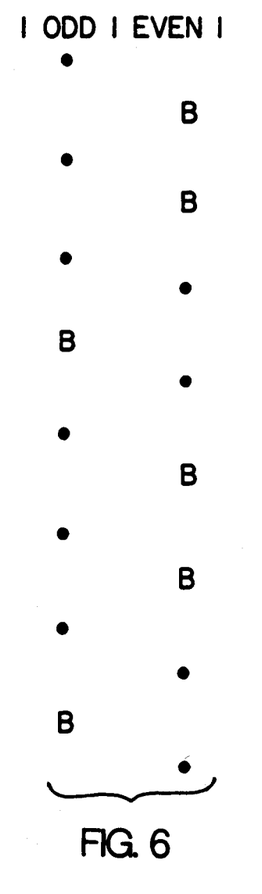
FIG. 6 is an illustration of a known expansion technique.

In a solution to this problem, in accordance with the disclosure of U.S. Pat. No. 4,746,981, this vertical distortion may be overcome by blanking every fourth line in the odd fields, and blanking out the first two of every four lines of the even fields, of the enlarged image. This is illustrated in FIG. 6, wherein the lines of the odd and even fields that are displayed are shown as dots, whereas the lines that are blanked are indicated by the letter B. In this illustration, each three successive lines of the odd field replicates the same video line, and the sequences of two even video lines that follow one another replicate the same line from the even video fields. As a result, in the expanded image, only three lines are omitted in each group of eight successive lines representing an odd field video line and the next successive even field video line of the original image. It is further evident that the technique illustrated in FIG. 6 maintains the correct order of information of lines of the odd and even fields.

Figure 7:
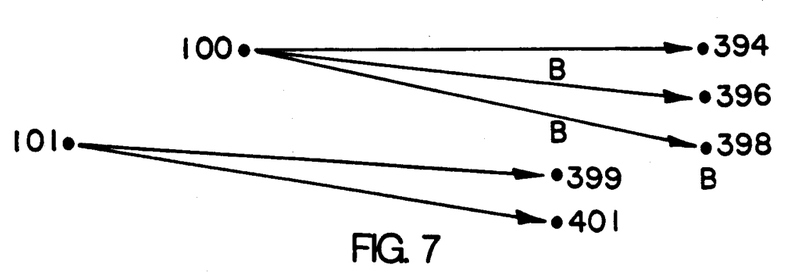
FIG. 7 is a further illustration of the expansion arrangement of FIG. 6.

The correspondence between the original video line and the lines of the expanded image, in accordance with the arrangement of FIG. 6, are shown in FIG. 7, FIG. 7 clearly showing that the first two lines of the odd field are blanked and the last line of the even field is blanked, in each sequence of eight lines in the expanded image. Thus, a non-visual distorted picture may be provided by selectively blanking of the multiply replicated lines of the odd and even fields. Other combinations of blank lines and replicated lines may be employed to produce the same effect, within the scope of the invention.

Figure 8:
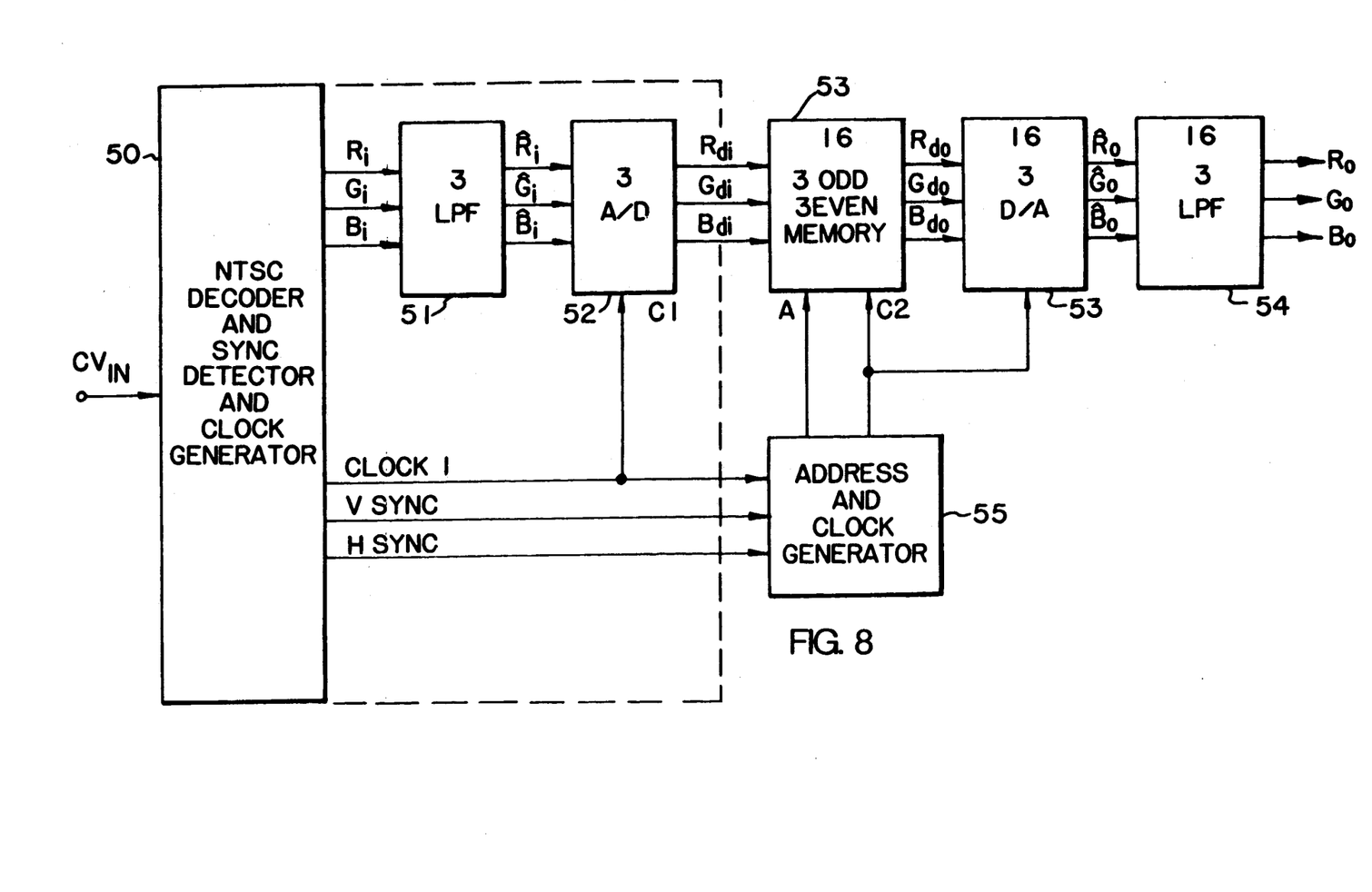
FIG. 8 is a block diagram of a signal processing system that may be employed in the invention.

FIG. 8 discloses one arrangement that may be employed to modify the video signals in accordance with the disclosure of U.S. Pat. No. 4,746,981, for display on multiple display screens, is illustrated in FIG. 8. In this arrangement, a composite video signal CV of conventional nature, for example a color signal in accordance with NTSC requirements, is applied to an NTSC decoder, synchronization signal detector and clock generator 50. This circuit processes television video signals in the conventional manner, to produce, for example, red, green and blue color signals (Ri, Gi, Bi), a clock signal C1, and vertical and horizontal synchronization signals H and V. The color signals are applied to separate low pass filters 51, the drawing hence illustrating three such filters. The filters prepare the signals for digitization to prevent aliasing. Separate filtered color signals are then applied to separate analog to digital converters 52, the figure illustrating three such converters. The digitization rate is determined by the clock C1 from the clock generator, and is of a rate adequate to digitize signals of the frequency of the video signals, in accordance with conventional practice. The generation of the clock signals in the circuit 50 may of course be effected in accordance with conventional practice.

The digitized color signals are then applied to memories 53. A memory system is provided for each of the display screens in the expanded display, for example 16 memory systems in the above discussed example employing 4 rows of vertically stacked display screens, each having 4 display screens. Further, each memory system preferably incorporates three memories for storing the separate color signals of odd fields, and three memories for storing the separate color signals of even fields. It is of course apparent that for a black and white display only a pair of memories, for the odd and even fields, need be employed.

The read output of the memory systems for corresponding display screens are directed to separate digital to analog converters 53, and then to separate low pass filters 54, to produce the output color signals (Ro, Go, Bo) for application to the respective separate display screens. Thus, in the illustrated example, each read out color signal for each display screen is processed through a separate digital to analog converter and a separate low pass filter. The read/write control and addressing of the memories 53 is effected by an address and clock generator 55, the address and clock generator providing address signal A for the memories, and clock signals C2 for the memories and the converters 53. Addressing clock pulses are synchronized with the vertical and horizontal synchronization signals as well as with the clock signal from the circuit 50.

Figure 9:
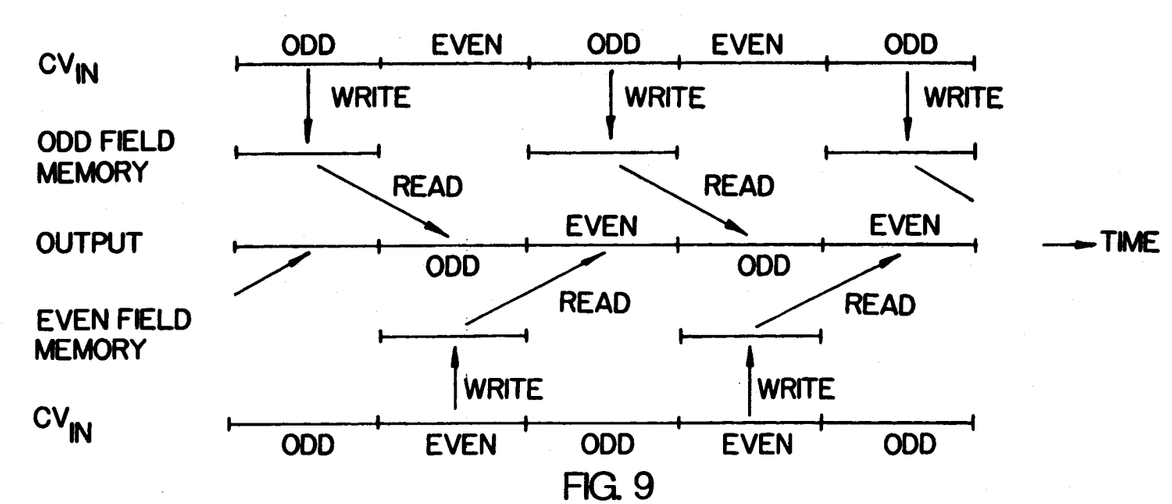
FIG. 9 illustrates a known memory read/write method that may be employed in the invention.

One method for writing data in the memories, and reading data therefrom, is illustrated in FIG. 9, wherein the top and bottom horizontal lines of the figure illustrate the composite video input signal CVin, with the sequential odd and even field data. The video information of the odd fields is written in the odd field memory, and the video information from the even fields is written into the even field memory. The data corresponding to the odd fields is read from the odd field memory at a time delayed one field time from when it was written, and, similarly, data in the even fields is read from even field memory at a time delayed by one field from the time when this data was written in the memory. By employing this double buffering technique, each memory is always being either written to or read from, but not simultaneously.

The method of detecting odd or even fields, as disclosed in U.S. Pat. No. 4,746,981, is based upon the standard NTSC format, in which the starting line of the image of one field occurs an integral number (16) of horizontal pulses following the vertical synchronization pulse, while the first horizontal pulse corresponding to a line to be displayed occurs at a time corresponding to an integral number (16) plus one half horizontal line period following the vertical synchronization pulse. It is hence only necessary to count horizontal pulses following the vertical synchronization pulse to determine whether the current video information is derived from an odd or an even field.

Figure 10:
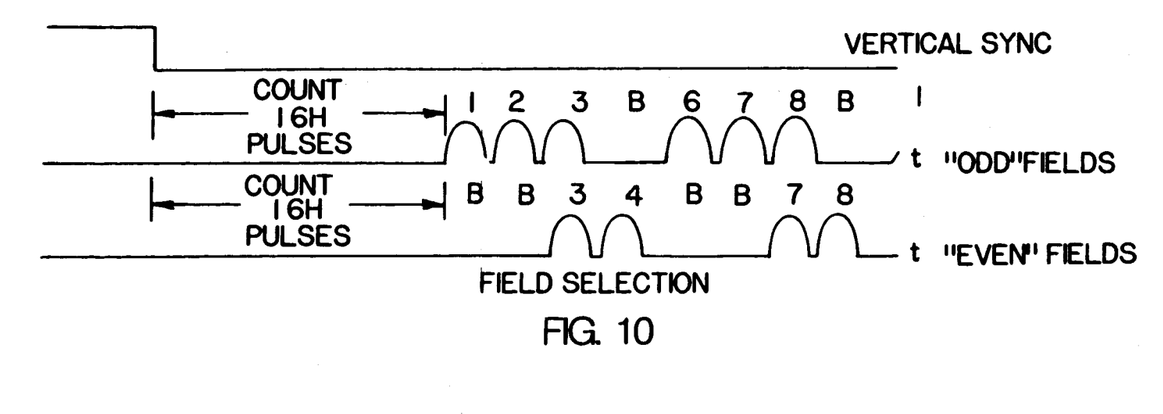
FIG. 10 illustrates a known technique for the selection of fields.

The video information is stored in the memory system of each display screen in accordance with the sequence of signals to be displayed on the respective display screen, so that the data may be readily sequentially read out from the rows of the odd and even field memories of that display screen. It will of course be apparent that other memory storage techniques may alternatively be employed, employing different memory read out techniques. In the preferred technique, however, after the detection of the reception of data corresponding to an odd field, the video information of the first line of the video signal is replicated in the first three rows (or the equivalent thereof) of the odd field memory, the fourth row thereof being left blank. Similarly, the video information from the third video line of the original video signal is replicated in the next three rows of the odd field memory, with the following row being left blank, etc. Upon the detection of the reception of video information from an even field, the video information of the first line is replicated in the third and fourth rows of the even field memory with the first two rows being left blank. Then, video information from the second line of the even field video signal is replicated on the seventh and eighth row of the even field memory, with the fifth and sixth rows left blank. This technique is illustrated in FIG. 10. When the data is stored in this manner, the even and odd field memories may read out on a row by row basis, to produce the output video information directly for the respective display screen. The lines of original video information that are stored in each memory correspond only to those lines that will be displayed on the given display screen, the representation of FIG. 10 thus being correct only for the top row of display screens when the display screens are stacked four high in the vertical direction. Data stored for display screens of different vertical levels must have correspondingly different sequences of lines of the original video signal.

SUMMARY OF THE INVENTION

While the invention of U.S. Pat. No. 4,746,981 provides a solution that overcomes the problem resulting from improper spatial presentation of the lines due to interlace, it has been found that, in displays having a large number of monitors, the blanking of lines may on some occasions produce an unpleasing effect. The invention is therefore directed to minimizing such unpleasing effects.

Briefly stated, the invention provides a method and apparatus for displaying an interlaced image on a plurality of display screens in which the lines of two fields of the image are replicated a plurality of times in a memory to produce an enlarged image, and determined lines from both of the fields are read out of the memory and combined for the production of the display screen signals.

In accordance with one embodiment of the invention, a method is provided for producing display signals, from video signals, for application to a monitor, for the displaying on the monitor of an image that is formed by only a portion of the successively occurring scan lines of information of the video signals. The video signals contain successively occurring video field data of first and second interlaced fields of a full image, video data of each field comprising successively occurring video line data corresponding to successive scan lines of the respective field. Signals for determined scan lines for display on the monitor are formed by combining the video field data of adjacent video line data of the same video field data. Predetermined lines of the display on the monitor may also be blanked. The signals may be formed by selecting scan lines of the first field for application to a delay device, then adding and averaging the output of the delay device and a selected scan line of the second field, whereby the corresponding line on the display device contains information from adjacent scan lines.

In a further feature of the invention, a method is provided for producing display signals, from video signals, for application to a monitor, for the displaying on the monitor of an image that is formed by only a portion of the successively occurring scan lines of information of the video signals. The video signals contain successively occurring video field data of first and second interlaced fields of a full image, video data of each field comprising successively occurring video line data corresponding to successive scan lines of the respective field. The method includes the steps of writing the video signals in a memory for storing therein at least a portion of the video line data of each the field, and reading the memory to produce the display signals. In accordance with the invention, video line data is sequentially read from the memory corresponding to at least portions of adjacent scan lines of a respective field, and the read out data is combined to produce video line data that is a combination of data from the two lines. The added signals are preferably averaged.

The invention also provides an apparatus for producing display signals, from video signals, for producing an image that contains only a portion of the image information of the video signals, wherein the video signals contain successively occurring video field data of first and second interlaced fields of a full image, the video data of each field comprising successively occurring video line data corresponding to successive scan lines of the respective fields. The apparatus comprises memory means, means applying the video signals to the memory means for storing therein at least a portion of the video line data of each the field, and means for reading the memory means to produce the display signals. The reading means comprises means for sequentially reading video line data corresponding to scan lines of the first and second fields, and means for combining video line data of the determined scan lines of a common field to produce combined signals corresponding to a determined line of the display signals.

The combining means may comprise delay means, averaging means, means for sequentially applying outputs of the memory means corresponding to adjacent scan lines to the delay means and the averaging means, and means applying the output of the delay means to the averaging means.

BRIEF FIGURE DESCRIPTION

In order that the invention may be clearly understood, it will now be disclosed in greater detail with reference the accompanying drawings wherein:

FIG. 1b is a representation a plurality of display screens each showing the image Figure of 1a;

FIG. 1c is a representation of a plurality of display screens showing a composite enlarged image corresponding to that of FIG. 1a;

DETAILED DISCLOSURE OF THE INVENTION

Figure 11:
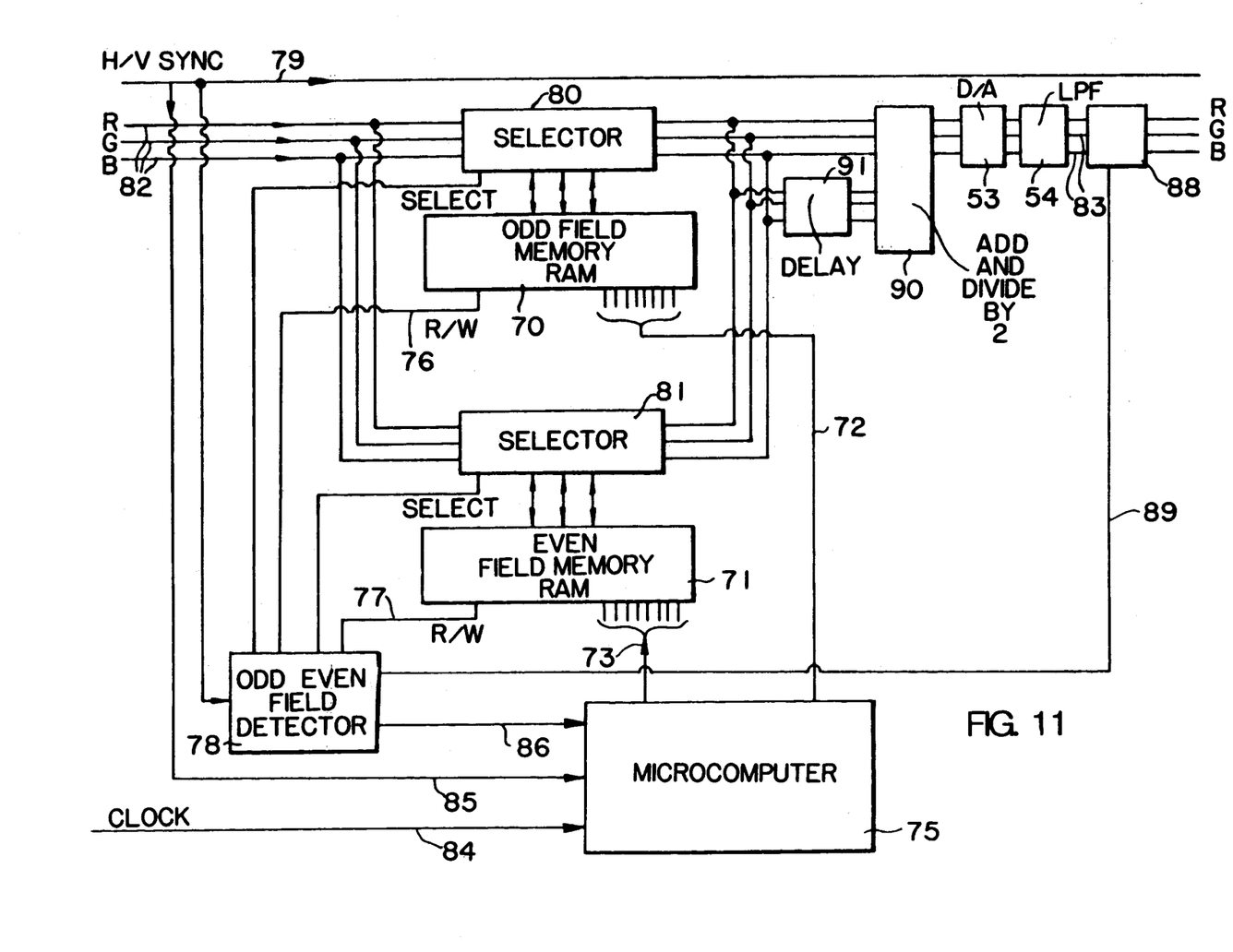
FIG. 11 is a more detailed block diagram of a portion of the system of FIG. 8, in accordance with the invention.

Referring now to FIG. 11 therein is illustrated one arrangement that may be employed in accordance with the invention for storing the video data and reading it out. This figure illustrates a system for storing the color signals of a single display screen in the expanded image, for the odd and even fields. Thus, the odd field memory 70 may comprise three separate memories, and the even field memory 71 may similarly comprise three separate memories. While the memories 70, 71 are illustrated with single inputs and outputs for each color signal, it will be apparent that a plurality of bits are stored and read out for each address location, in dependence upon the number of output lines of the analog to digital converter 52 of FIG. 8. The memories 70, 71 may be of any conventional RAM structure, having address lines 72, 73 respectively connected to a microcomputer 75. The memories 70, 71 further have read/write select lines 76, 77 coupled to an odd/even field detector 78, for enabling the odd field memory, to have data written therein during the occurrence of odd fields and to have data read therefrom during even fields. Similarly, the detector 78 enables the even field memory to have data written into it during the even field and data read therefrom during the odd fields of the video input signal. For this purpose the detector 78 may receive the horizontal and vertical synchronization signals from the line 79, determining the present field by conventional means such as discussed above. In order to direct the color signals to the respective memories during the proper fields, and to read the memories to apply the recovered signals for application to the display, conventional selectors 80, 81 may be provided connected to apply the output of the converter 52 to the data lines of the memories 70, 71. The select lines of the selectors 80, 81 are also controlled by the odd/even detector. Thus, the original color signals R, G and B on lines 82 are applied to each of the selectors 80, 81. During the odd fields the select line of the selector 80 couples the video signal lines 82 to odd field memory 70, and couples the output video lines 83 to the even field memory 71. Similarly, during the even fields of the original signal, the incoming video signals on lines 82 are applied by way of the selector 81 and the output lines 83 are coupled to read out the odd field memory 70.

The microcomputer 75, which may be of conventional design, provides the address sequences for reading out and writing in memories 70, 71, and may, for example, have as further inputs the output of the detector 78, the horizontal and vertical synchronization signals and the clock signal that was employed for controlling the analog to digital conversion illustrated in FIG. 8. The program of the microcomputer thus sequences the address on the address lines 72, 73, for example at the rate of the clock on line 84, which may be derived from the clock generator of FIG. 8. The program of the microcomputer maintains a count of the current line in the original video signal, in response to the horizontal and vertical synchronization signals, as well as a count the clock on line 84, in order to enable the stepping of the address signals for memories 70, 71 to commence at determined lines and positions on the lines of the original video signal. The desired starting lines and positions of the lines of the original signals may be automatically controlled by the program of the microcomputer 75, or the desired value may be input by way of a conventional keyboard of the microcomputer.

The replication of the signal to appear in a number of selected rows of the memory may be effected by sequentially addressing the desired rows of the memory during the occurrence of each color signal pulse, at a rate faster than the digital rate of the signals. Similarly, the expansion of signals in the horizontal direction may be effected by stepping the addresses for each line at a rate that is a multiple of color signal pulse rate. These rates may of course be varied, if desired, by keyboard control of the microcomputer.

The data read out of the memories 70, 71 is applied directly to a circuit 90, and also via a delay circuit 91 to the circuit 90. The circuit 90 adds the two inputs applied thereto, and divides the sum by two. The output of this circuit is directed to the digital to analog converter, and thence to the attenuator 88 via the low pass filter 54. The attenuator 88 is controlled by the Odd/Even Field Detector 78 via line 89. The purpose of the attenuator 88 is to reduce "wide area flicker" arising from unequal numbers of lines in each of the two fields. The field indication signal on line 89 is high during the time when the field having the higher number of non-blank lines is present. This field indication signal attenuates the amplitude on the R-G-B signal by an amount to reduce its average level of brightness to that of the field having the smaller number of non-blank lines, if blanked lines are provided. While a microcomputer has been illustrated as constituting one arrangement for providing the desired addressing sequences for the memories, it is of course apparent that other arrangements, such as hard wired random logic circuits, may alternatively be employed for this purpose.

While, as above discussed, it has been found that the blanking of determined lines in accordance with U.S. Pat. No. 4,746,981 has reduced or eliminated some annoying visual artifacts, on occasion the blanked lines themselves produced annoying effects. This was especially true with respect to very large displays. Thus, the effect was tolerable when using a 16 monitor display arranged in a four by four matrix, but became increasingly more annoying for larger displays. Such larger displays may have been produced, for example, by first producing signals for a two by two matrix, and then using the separate outputs thereof for driving four by four matrices. In this latter arrangement, the signals resulted in a displeasing repeating pattern on the screens.

Figures 12A, 12B:
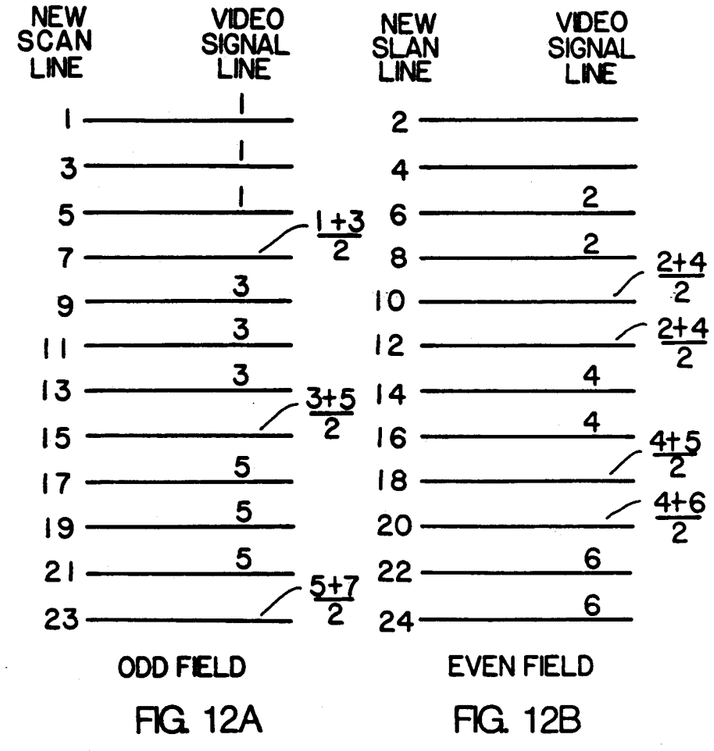
FIGS. 12A and 12B illustrate one example of a manner of combining signals of various scan lines, in accordance with the invention, for the odd and even fields, respectively.
Figure 13:
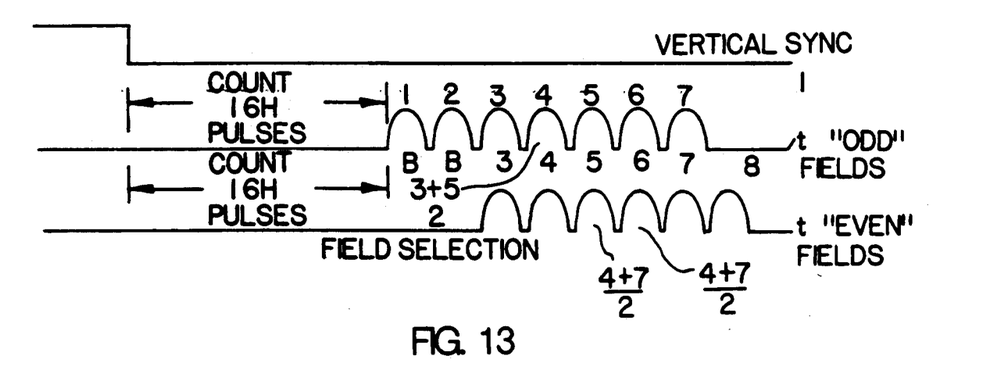
FIG. 13 illustrates the line combination technique of FIG. 12, in another manner.

In accordance with the present invention, however such effects may be reduced or eliminated by combining various lines for the display. For example, FIGS. 12A and 12B illustrate the development of signals for a four by four matrix of monitors. In such an arrangement, as discussed with respect to FIG. 10, certain scan lines of the odd and even fields had been blanked. Specifically, instead of replicating each line of video signals of the odd field four times for monitor scan lines, the fourth line of the monitor was left blank. Similarly, instead of replicating each line of video signals of the even field four times for monitor scan lines, the first and second scan lines of the monitor corresponding to the even field were left blank. As illustrated in FIGS. 12 and 13, however, in accordance with the invention every fourth line of the odd fields of the monitors is derived from adjacent video lines of the odd field. Thus, the seventh scan line of the monitors is formed by adding the first and third scan line of the video signals (i.e. the signals that appear in the fifth and seventh scan lines of the respective monitor), the sum being divided by two. Similarly first and second of every group of signals derived from the even field video signals is formed by combining the adjacent scan lines of the even field. For example, the tenth and twelfth scan lines of the monitor are formed from the second and fourth lines of the video signals (i.e. the combination of the fourth and seventh scan lines of the monitor) divided by two.

This combination of signals may be produced in the arrangement of FIG. 11, for example, by selecting the output signals from the odd and even field memories in the proper order. Thus, in the display of the odd field, the first line of the original signals are replicated on the first, second and third lines of the monitor. In order to combine the signals of adjacent lines of the video signals, the bits of one line of the odd or even field signals are selected before the bits of another line of the odd and even fields, respectively, and are delayed by the delay circuit 91 to be applied to the input of the adder 90 at the same time as the corresponding bits of the signals of the other line of the respective field. The resultant is divided by two to produce the average of the input signals, and applied to the digital to analog converter 53. It is thus evident that the various lines of the display may be developed separately from the signals of the odd or even fields, or from a combination of adjacent lines of the respective fields, by selection and read out of the odd and even field memories at predetermined times. The delay circuit permits the signals to be combined for application to the adder 90 at the same time, and the adder circuit further divides the result by two to produce and average signal for the combined lines.

Figure 14:
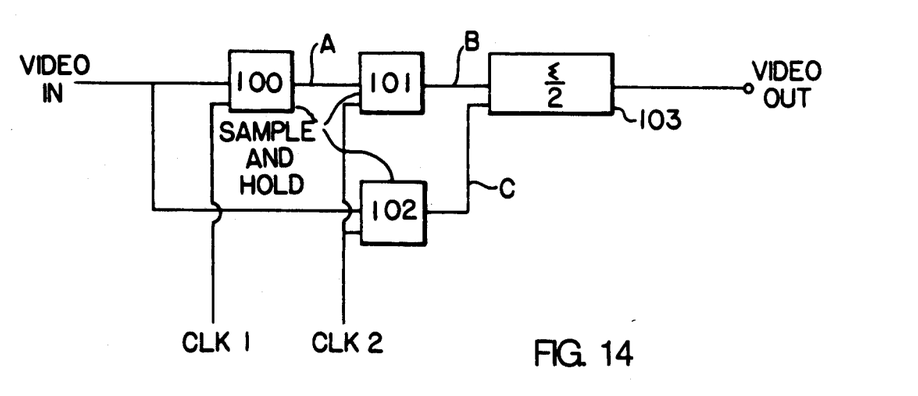
FIG. 14 is a block diagram of a circuit that may be employed for combining the video signals of adjacent lines, in accordance with the invention.
Figure 15:
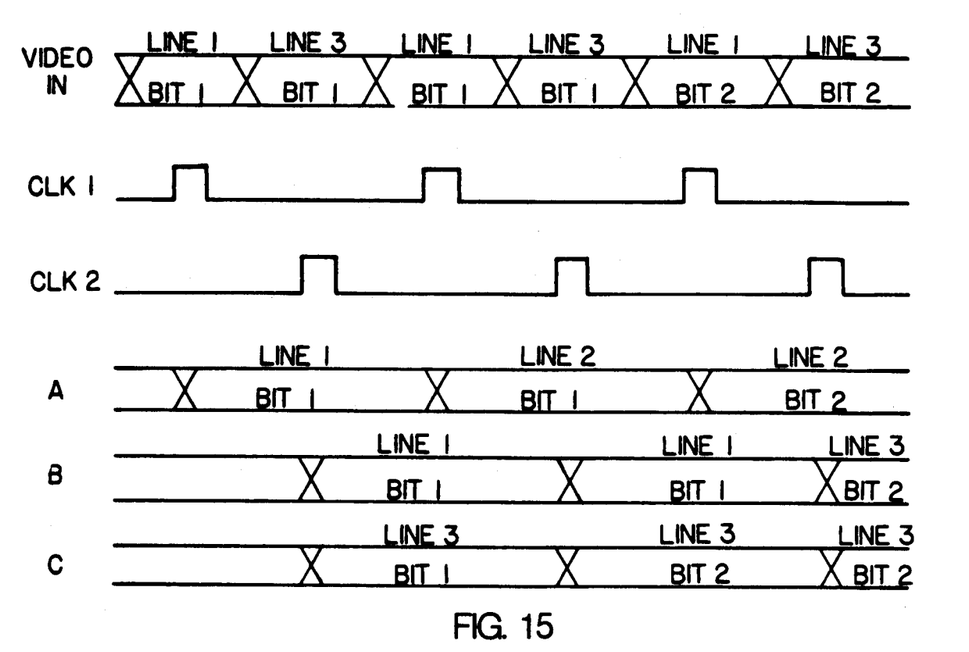
FIG. 15 is a time diagram illustrating various waveform in the use of the circuit of FIG. 14.

Another embodiment of a combining circuit that may be employed for combining the signal of adjacent lines, in accordance with the invention, is illustrated in FIG. 14, wherein analog video signals from the converter 53 of FIG. 11 are applied to the data terminals of sample and hold circuits 100 and 102, and the output of the sample and hold circuit 100 is applied to a further sample and hold circuit 102. The data outputs of the sample and hold circuits 101 and 102 are applied to a circuit 103 that adds the two signals and outputs one half of the sum thereof. The circuit 100 is sampled by a first clock CLK1 and the circuits 101 and 102 are sampled by a second clock CLK2. As illustrated in FIG. 15, the two clocks have the same repetition rate, but are 180° out of phase. The clocks may be derived in any conventional manner, for example by the clock generator of FIG. 8. When the signals are to be combined, the input video signals, as shown in the first line of FIG. 15, are selected under the control of the microcomputer 75, to alternately output signals from the lines to be combined, at twice the clock rate of the circuits 100–102. Accordingly, as shown at line A of FIG. 15, the output (point A) of the circuit 100 is always derived from the first of the video lines, and consequently the output (point B) of the circuit 101 is also always derived from the first of the video lines. The output at point C of the circuit 102, however is always derived from the second of the two selected video lines.

It is apparent of course that the invention is not limited to the combination and blanking of the specifically described lines, and that signals may be derived in a similar manner for other monitor systems, such as a two by two matrix of monitors, a three by three matrix of monitors, etc.

Reference has made herein to the display screens of television sets or receivers and monitors. It will be apparent, from the standpoint of the present invention, that any conventional display device may be employed in accordance with the invention, and the foregoing disclosure hence employs such terms in a similar manner.

While the invention has been disclosed and described with reference to a limited number of embodiments, it is apparent that variations and modifications may be made therein without varying from the spirit and the scope of the invention, and it is therefore intended in the following claims to cover each such variation and modification falls within the true spirit and scope of the invention.

What is claimed is:

1. A method for displaying an image from video signals, comprising the steps of:
    generating video signals indicative of an interlaced image, said video signals containing video field data in two interlaced fields, each of said fields comprising successively occurring video line data;
    enlarging the image by replicating the video line data;
    determining where replications of the video line data of each of the interlaced fields would result in distortion between the two interlaced fields;
    providing a selected combination of video line data in place of the replications which would result in said distortion; and
    displaying the enlarged image on a plurality of monitors each having successively occurring scan lines so that each of the monitors displays at most a respective portion of the enlarged image which is less than an entirety of the enlarged image and so that a composite of each portion displayed on the monitors together constitute the enlarged image, the step of displaying including interlacing the successively occurring scan lines for each respective one of said monitors, forming display signals for the video line data including that which was replicated and that which was provided, and correlating said display signals with said scan lines for the monitors so that each monitor will display only the respective portion of the enlarged image.

2. The method of claim 1 further comprising blanking the video line data which cause said distortion and filling in the blanked lines with said combination of video line data.

3. The method of claim 1 wherein said step of forming signals comprises selecting scan lines of a given field for application to a delay device, then adding and averaging the output of said delay device and a selected other scan line of said given field, whereby the corresponding line on said display device contains information from two scan lines of said given field.

4. The method of claim 1, further comprising writing said video signals into memory and sequentially reading video line data contained in the video signals from said memory that are in correspondence with at least portions of adjacent ones of said successively occurring scan lines of a respective one of said interlaced fields for producing said display signals.

5. The method of claim 1 wherein said memory comprises a memory for storing information of said adjacent scan lines, said step of combining comprising delaying signals corresponding to one scan line and adding said delayed signals to signals corresponding to an adjacent scan line.

6. The method of claim 5 further comprising averaging said added signals.

7. The method of claim 1, further comprising: averaging selected ones of said video line data to provide said combination of video line data.

8. The apparatus of claim 7 wherein said combining means comprises means comprises delay means, averaging means, means for sequentially applying outputs of said memory means corresponding to said first and second fields to said delay means and said averaging means, and means applying the output of said delay means to said averaging means.

9. An apparatus for displaying an image from video signals, comprising:
   means for generating video signals indicative of an interlaced image, said video signals containing video field data in two interlaced fields, each of said fields comprising successively occurring video line data;
   means for enlarging the image by including means for replicating the video line data;
   means for determining where replications of the video line data of each of the interlaced fields would result in distortion between the two interlaced fields;
   means for providing a selected combination of video line data in place of the replications which would result in said distortions; and
   means for displaying the enlarged image on a plurality of monitors each having successively occurring scan lines so that each of the monitors displays at most a respective portion of the enlarged image which is less than the entirety of the enlarged image and so that a composite of each portion displayed on the monitors together constitute the enlarged image, said displaying means including means for interlacing the successively occurring scan lines for each respective one of said monitors, means for forming display signals for the video line data including that which was replicated and that which was provided, and means for correlating said display signals with said scan lines for the monitors so that each monitor will display only the respective portion of the enlarged image.

10. The apparatus of claim 9, further comprising:
    means for blanking said video line data which would cause said distortion and means for filling in said blanked video line data with said combination of video line data.

11. The apparatus of claim 9, further comprising:
    means for averaging selected ones of said video line data to provide said combination of video line data.

* * * * *